(12) United States Patent
Rennetaud et al.

(10) Patent No.: US 6,832,449 B2
(45) Date of Patent: Dec. 21, 2004

(54) DOOR SUSPENSION SYSTEM

(75) Inventors: Jean-Marie Rennetaud, Chester, NJ (US); Tian Zhou, Littau (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 10/034,008

(22) Filed: Dec. 20, 2001

(65) Prior Publication Data
US 2003/0110696 A1 Jun. 19, 2003

(30) Foreign Application Priority Data
Dec. 22, 2000 (EP) .............................................. 00811235

(51) Int. Cl.$^7$ .............................................. E05C 7/06
(52) U.S. Cl. ............................................. 49/120; 49/118
(58) Field of Search .......................... 49/360, 362, 410, 49/409, 116, 118, 120

(56) References Cited

U.S. PATENT DOCUMENTS

| | | | | |
|---|---|---|---|---|
| 3,858,452 A | * | 1/1975 | Gatland et al. | 74/424.78 |
| 4,091,570 A | * | 5/1978 | Favrel | 49/118 |
| 4,147,073 A | * | 4/1979 | Mercier | 74/424.78 |
| 4,272,923 A | * | 6/1981 | Anderson | 49/360 |
| 4,544,985 A | * | 10/1985 | Metz et al. | 361/144 |
| 4,624,617 A | * | 11/1986 | Belna | 414/347 |
| 4,641,065 A | * | 2/1987 | Shibuki et al. | 318/135 |
| 4,698,876 A | | 10/1987 | Karita | |
| 4,839,543 A | | 6/1989 | Beakley et al. | |
| 5,077,938 A | * | 1/1992 | Moreuil | 49/362 |
| 5,085,094 A | * | 2/1992 | Clawson et al. | 74/424.6 |
| 5,134,324 A | * | 7/1992 | Sakagami et al. | 310/12 |
| 5,172,518 A | * | 12/1992 | Yoshino | 49/360 |
| 5,175,455 A | * | 12/1992 | Penicaut | 310/12 |
| 5,235,226 A | * | 8/1993 | Olsen et al. | 310/12 |
| 5,380,095 A | * | 1/1995 | Pryor | 384/8 |
| 5,594,316 A | * | 1/1997 | Hayashida | 49/31 |
| 5,712,516 A | * | 1/1998 | Kabout | 310/12 |
| 5,736,693 A | * | 4/1998 | Piech et al. | 187/316 |
| 5,907,890 A | | 6/1999 | Redaelli | |
| 5,949,036 A | * | 9/1999 | Kowalczyk et al. | 187/316 |
| 6,032,416 A | * | 3/2000 | Springer et al. | 49/119 |
| 6,055,777 A | * | 5/2000 | Rekioja | 49/360 |
| 6,131,340 A | * | 10/2000 | Clark et al. | 49/410 |
| 6,289,643 B1 | * | 9/2001 | Bonar | 52/207 |
| 6,324,789 B1 | * | 12/2001 | Stephen | 49/362 |
| 6,446,389 B1 | * | 9/2002 | Heffner et al. | 49/280 |
| 6,467,584 B2 | * | 10/2002 | Yamamoto et al. | 187/316 |

FOREIGN PATENT DOCUMENTS

| | | |
|---|---|---|
| EP | 0 614 844 A2 | 9/1994 |
| EP | 0 614 844 A3 | 9/1994 |
| EP | 0 841 286 A1 | 5/1998 |
| JP | 03244777 | 10/1991 |

* cited by examiner

Primary Examiner—Leslie A. Braun
Assistant Examiner—Khoa Tran
(74) Attorney, Agent, or Firm—MacMillan, Sobanski & Todd, LLC

(57) ABSTRACT

A door suspension system includes a rail support attachable to a crosspiece of a door and having a part shaped as a rigid substantially flat plate that supports a rail. A pair of brackets, each having a connector, are attached to support block having an opening in which the rail is partially received. The connectors have a substantially C-profile embracing the flat plate and the rail. A support strip is attached to the connectors and is provided with a connection device for suspending the door of an elevator. A magnetic way is attached to the plate and an elongated primary of a linear motor is attached to the strip in such a manner that the attraction force between the magnetic way and the primary cancels at least partially the weight of the door. The door suspension system further includes a bearing of substantially cylindrical shape with an axial recess. The bearing is mounted in the opening of the support block to guide the rail.

12 Claims, 3 Drawing Sheets

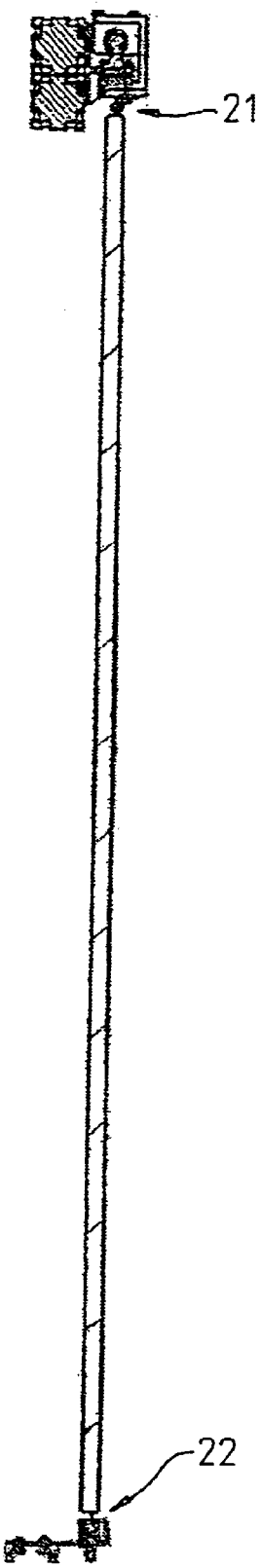
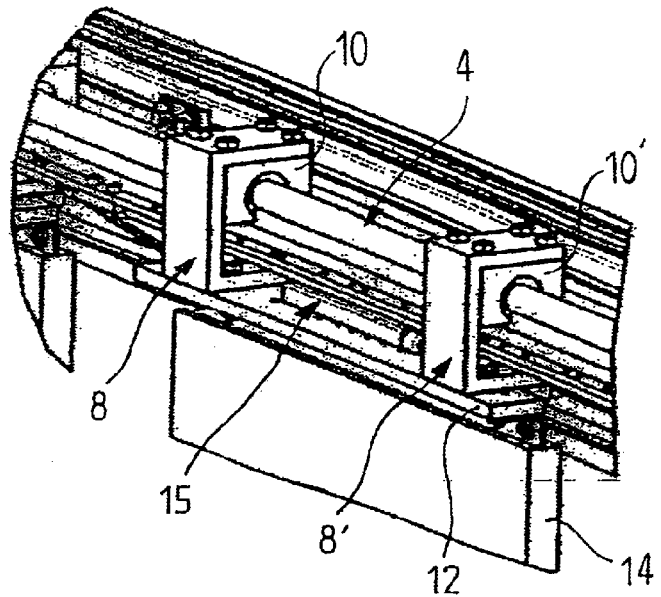
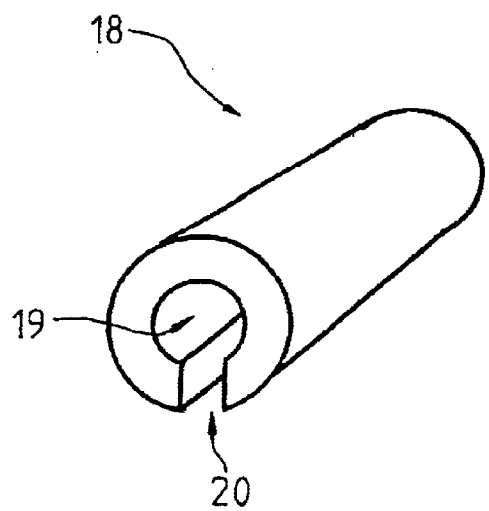

DOOR SUSPENSION SYSTEM

BACKGROUND OF THE INVENTION

The present invention relates to a door suspension system and, in particular, to an elevator car door suspension system.

The European patent application No. 0 841 286 A1 discloses an elevator car door suspension system for opening and closing elevator car doors including a linear induction motor having a pair of movable motor primaries attached to a respective door hanger of each door and a stationary motor secondary attached to a header bracket which is secured to the elevator car, and wherein the motor secondary comprises a substantially flat plate which is vertically disposed and is preferably made of a conductive metal as copper. In this system, in which the door panels are guided by separate rails, a pair of moving flexible ropes and wheels is needed to the panels moving synchronously.

A problem with an elevator car door suspension system having moving flexible ropes and wheels is that it is difficult to adjust and, thus, very expensive. Another drawback is due to stability and maintenance problems.

SUMMARY OF THE INVENTION

The present invention concerns an apparatus for suspending doors such as elevator car doors.

An object of the present invention is to provide an improved door suspension system.

One of the advantages of the door suspension system according to the present invention is that it can be easily and inexpensively manufactured and easily and quickly installed.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is a fragmentary perspective view of the door suspension system shown in FIG. 1;

FIG. 4 is a simplified perspective view of a bearing located between a rail and a bracket of the door suspension system shown in FIG. 1;

FIG. 5 is a sectional view of a panel door with an upper hinge joint and a lower guiding joint according to the present invention;

DESCRIPTION OF THE PREFERRED EMBODIMENT

Figure 1:
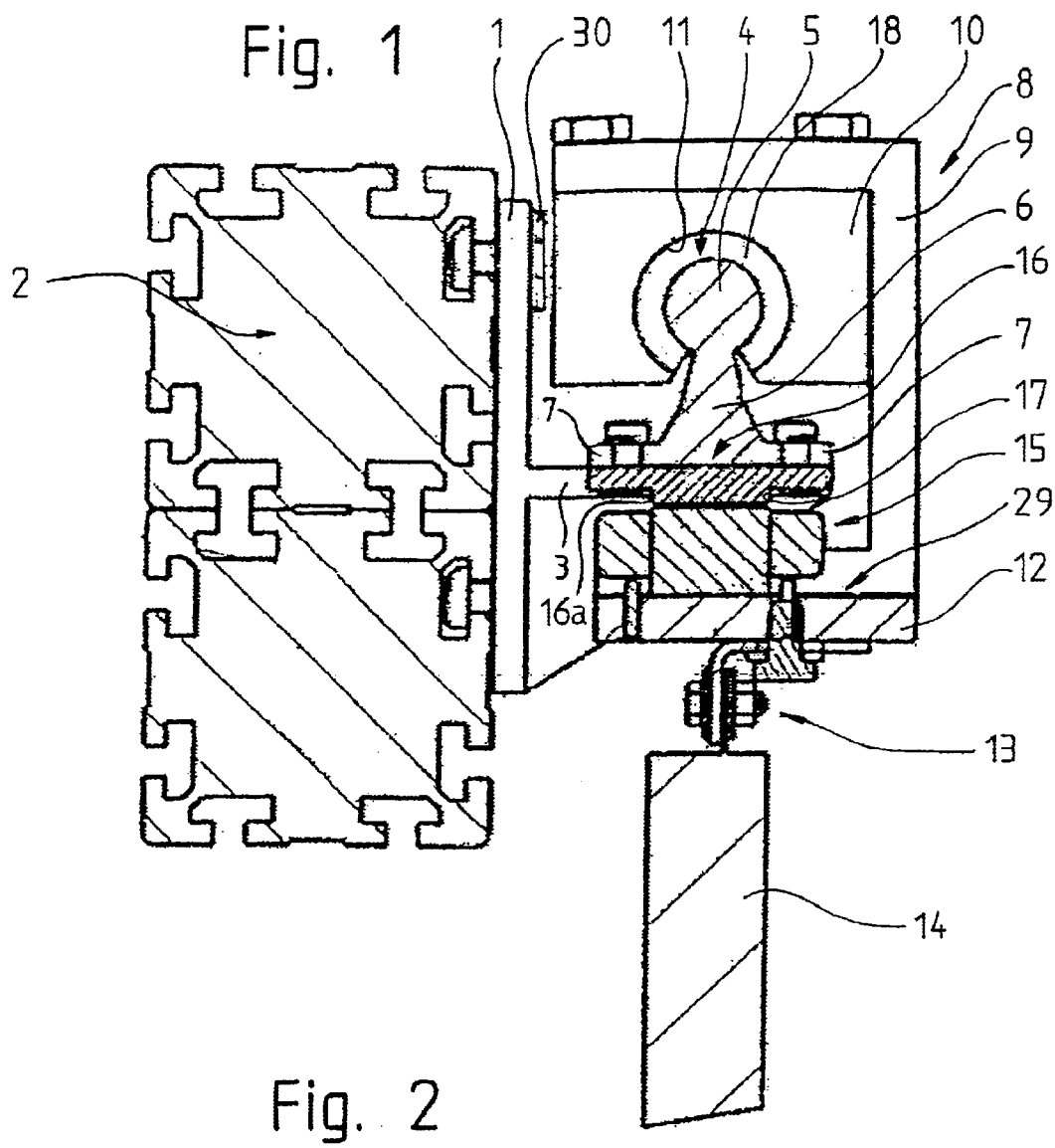
FIG. 1 is a schematic sectional view of a door suspension system for an elevator car according to a first embodiment of the present invention.
Figure 2:
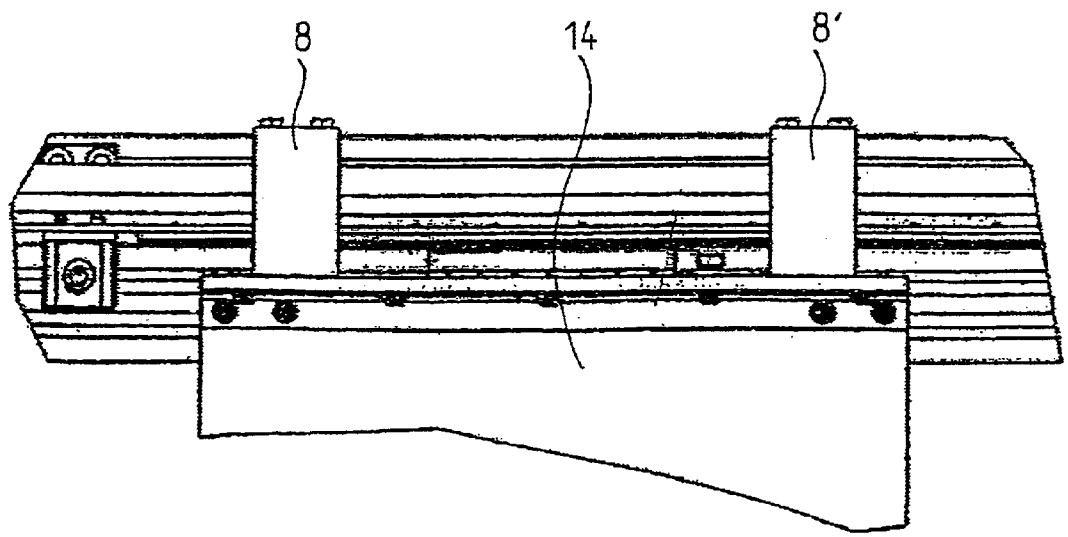
FIG. 2 is a fragmentary front elevation view of the door suspension system shown in FIG. 1.

The door suspension system shown in FIG. 1 includes a rail support 1 attached to a crosspiece 2 of a door frame and disposed above the doorway or entrance portal. The system may be applied to doors, windows, opening portions as doorways of industrial buildings, houses, elevator cars, vehicles and the like. Preferably, the rail support 1 has a T-profile or an L-profile. In the position shown in FIG. 1, the T-profile is turned counterclockwise at an angle of 90° degrees. The horizontal part of the rail support 1 is a rigid substantially flat plate 3 which supports a linear rail 4, e.g. of a commercially available type, extending at least approximately the length of the door or having approximately the same length as the required door travel. The rail 4 has a substantially cylindrical head body 5 and supported by a vertical web 6 with horizontal extensions 7 attached to the plate 3. An example of a linear rail is the Thomson rail system currently used in certain industrial linear motion applications and available from Thomson Industries, Inc. of Port Washington, N.Y. The door suspension system includes a bracket 8 including a connector 9 joined to a support block 10 having a recess or opening 11, in which the cylindrical body 5 with a part of the web 6 is introduced. The connector 9 has a substantially C-profile embracing the flat plate 3 with the linear rail 4. Attached to the outer lower surface of the bottom of the connector 9 there is a support strip or piece 12 with a connection means 13 from which a door or door panel 14 is suspended as seen in FIG. 2. The connection means 13 preferably include screws or other types of fastener for attaching the door panel 14.

The rail support 1 can be connected with the crosspiece 2 with connecting means 30, for instance a screw, a bolt or a nut. Between the connecting means 30 and the support block 10 there is a gap, so that the support block 10 can move freely.

As shown in FIG. 3, the bracket 8 is attached to an end area of the strip 12, and the system includes a second bracket 8' (FIGS. 2 and 3) attached to the other end area of the strip 12. There is positioned in the space between the brackets 8 and 8' in elongated primary 15 (FIG. 1) of a linear motor, which preferably is a permanent magnet flat linear synchronous motor (PM-FLSM). Under the rail or in the flat plate 3 (FIG. 1) a magnetic way 16 is mounted which has at least approximately the same length as the required door travel. Such magnetic way 16 may be a magnetic track using magnets 16a, which may be rare earth permanent magnets, such as neodymium-iron-boron (NdFeB), cobalt, samarium or cheap hard permanent ferrite magnets disposed with alternating magnetic polarities. As shown in FIG. 1, the flat plate 3 has recesses 17 for receiving the magnet assemblies 16a of the magnetic way 16.

The brackets 8 and 8' each also have a bearing or a bushing 18, like a linear plain bushing or a linear ball bushing, located in the air gap of the support block 10 between the body 5 and the inner border of the recess 11. As seen in FIG. 4, the bushing 18 may be a substantially cylindrical ring-shaped body with a hole 19 for the body 5 and a longitudinal opening 20 for the web 6. Preferably, the bushing 18 is made from a sliding synthetic material, for example plastic material such as the "iglide J" bearing available from igus, inc. of E. Providence, Rhode Island, or the Thomson "FluoroNyliner" bearing, or a linear ball bushing, for example of the Thomson "Super Smart" type. When the motor is active, the bushings 18 slide along the body 5.

FIG. 5 illustrates a door panel with an upper hinge joint 21 and a lower guiding joint 22. Since, as seen in FIG. 3, the linear motor primary 15 is attached to the door or door panel 14 via the brackets 8 and 8', both will be moved together.

The linear motor is disposed in such a way that the attraction force between the magnetic way 16 and the primary 15 cancels at least partially the weight of the door or door panel 14. This reduces considerably the radial force applied to the bearings or bushings 18 as well as the overall friction in the system and the maximum required force of the motor. This semi-active magnetic suspension allows the door to open faster and noise-less, the motor and the inverter to be smaller in size and the life of the linear bearings to increase substantially due to the load reduction.

Due to the relatively high attraction between the magnetic way 16 and the primary 15 it is convenient to use a very rigid guiding system so that no deflection and change in the air gap dimension can occur. This requirement is fulfilled by the linear rail system and the high stiffness of the brackets 8 and 8'. In order to accelerate the motion of the door, the primary current must be increased, which in turn increases the attraction force in the air gap, another reason why the rigidity of the system must be high.

Figure 6:
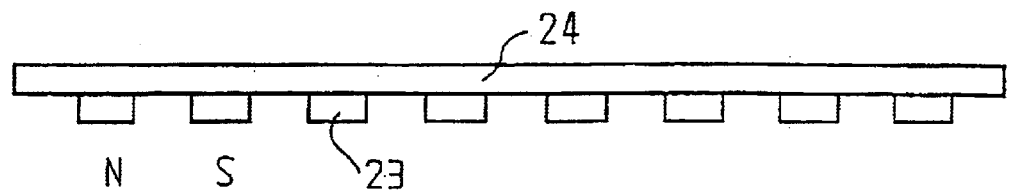
FIG. 6 is a schematic illustration of a structure of a magnetic track of a second embodiment of the present invention.
Figure 8:
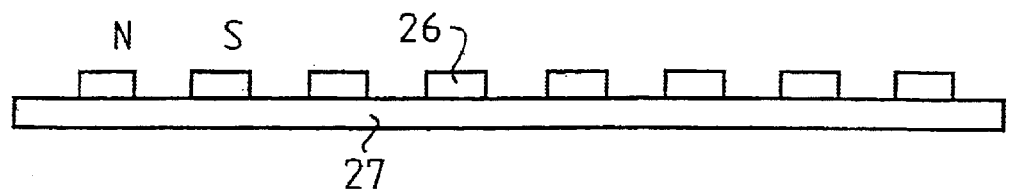
FIG. 8 is a schematic illustration of a structure of a magnetic track of a third embodiment of the present invention.
Figure 7:
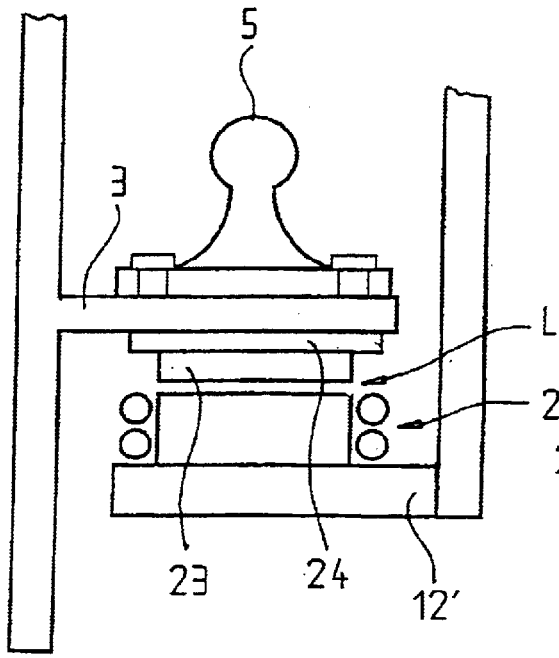
FIG. 7 is a schematic illustration of a primary of the linear motor of the second embodiment of the present invention.
Figure 9:
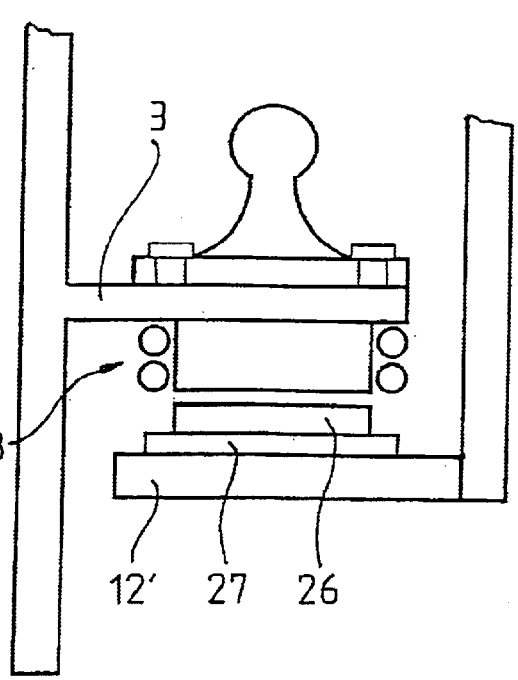
FIG. 9 is a schematic illustration of a primary of a linear motor of the third embodiment of the present invention.

Referring now to FIG. 6, another embodiment of a magnetic way is shown, in which the flat plate 3 is not provided with a recess for each magnet system, but magnets 23 are attached to a strip or back iron 24 which in turn is attached under the flat plate 3 as seen in FIG. 7, wherein a primary 25 is located over a strip 12'. FIGS. 8 and 9 show still another embodiment of the magnetic way, which is similar to the embodiment of FIG. 7 in that there are magnets 26 attached to a separate strip or back iron 27, but different from the embodiment of FIGS. 6 and 7 in that the strip 27 is attached over the support strip 12'. Accordingly, a primary 28 may be secured to the flat plate 3 under the same.

Other advantages of the system according to the present invention are that a high reliability can be achieved due to the great reduction in the number of parts in comparison with the prior art systems and the use of nearly maintenance-free components; also the volume of the motor and a suitable inverter can be reduced; extra heat generated in the primary can be avoided; no extra bearings are needed to keep the motor air gap constant, avoiding so stability and maintenance problems; and additional ropes and wheels are not needed.

The magnets 23 or 26 are disposed with alternating polarity on the surface of the strip 24 or 27, respectively, which may be a back iron with segments (not shown) intermediate to inset-mounted permanent magnets. The width of the intermediate segments may be smaller than that of the permanent magnets. Preferably, the back irons 24 and 27 with or without segments are formed from a soft magnetic material such as mild steel, preferably having a relative permeability $\mu_r \gg 1$. Accordingly, each sequence of magnetic elements 23 or 26 includes a flat permanent magnet with the N polarity above, an optional intermediate magnetic element, a flat permanent magnet with the S polarity above and an optional intermediate magnetic element. The intermediate magnetic elements may be flat elements of mild iron or steel, plates of ferrite, preferably but not exclusively soft ferrite. The magnets 23 and 26 and/or other optional intermediate elements may be glued to the back iron. The primary and the magnetic way are separated by an air gap L, e.g. of 1 to 2.5 mm. The air gap L can be adjusted by varying the thickness of suitable shims 29 (FIG. 1). The position control may comprise sensors according to the prior art or any other standard linear positioning devices. Note that there is a direct relationship between the door panel mass, the air gap L, the attraction force, and the required tractive force.

Although an open linear guide is disclosed, a closed linear guide or block 10 is also possible for this door suspension system. In a simplified embodiment of the invention without a motor, the primary may be replaced by a simple back iron. If the guide means 10 and 10' are made from a sliding synthetic material, for example the igus iglide J plastic material, the bearings 18 may be eliminated, and in this case the diameter of the opening 11 should be smaller, specifically, it must fit the rail or other equivalent element 4. Generally speaking, the guide means may or may not include the bearing 18.

It is an advantage of the present invention, that the use of a PM synchronous motor combined with a position (Hall effect) sensor achieves a very precise absolute positioning of the door panels as well as a re-initialization if needed.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A door suspension system comprising:
at least one rail support adapted to be attached to a door frame above a doorway opening;
an elongated rail mounted on said at least one rail support;
at least two brackets each having a connector attached to a respective support block, each said support block having a opening formed therein receiving at least a portion of said rail;
a support piece attached to said connectors and provided with connection means adapted to be attached to a door for suspending the door in the doorway opening; and
an elongated magnetic way attached to one of said at least one rail support and said support piece and a primary of a linear motor attached to the other one of said at least one rail support and said support piece, said magnetic way and said linear motor primary being positioned to generate an attraction force therebetween whereby when a door is attached to and suspended by said connection means, said attraction force adapted to cancel at least partially a weight of the door.

2. The door suspension system according to claim 1 wherein said at least one rail support includes an elongated rigid plate to which said rail and said magnetic way are attached, wherein each said connector has a substantially C-profile embracing said rail and said rigid plate, said rigid plate being formed of a ferromagnetic material and being substantially flat shaped with a horizontally disposed planar surface, ad wherein said primary is mounted on said planar surface of said support piece.

3. The door suspension system according to claim 1 wherein said at least one rail support includes an elongated rigid plate which said rail and said primary are attached, said rigid plate being formed of a ferromagnetic material and being substantially flat shaped with a horizontally disposed planar surface, wherein each said connector has a substantially C-profile embracing said rail and said primary, and wherein said magnetic way is mounted on said planar surface of said support piece.

4. The door suspension system according to claim 1 wherein each said bracket includes a bearing of substantially cylindrical shape with an axial hole formed therein, each said bearing being mounted in said opening of said support block and wherein said rail is received in said hole.

5. The door suspension system according to claim 1 wherein said at least one rail support includes a plate spaced above said support piece, said magnetic way is mounted on a lower surface of said plate and said primary is mounted on an upper surface of said support piece in a space between said brackets.

6. The door suspension system according to claim 1 wherein said at least one rail support includes a plate spaced above said support piece, said magnetic way is mounted on an upper surface of said support piece and said primary is mounted on a lower surface of said plate.

7. The door suspension system according to claim 1 wherein said rail has a substantially cylindrical bead body attached to an upper end of a web with extensions at a lower end thereof attached to said at least one rail support.

8. The door suspension system according to claim 7 wherein each said bracket includes a bearing of substantially cylindrical shape with an axial hole formed therein and a longitudinal opening extending from said axial hole, each said bearing being mounted in said opening of said support block, and wherein said head body of said rail is received in said axial hole and said web of said rail is received in said opening.

9. The door suspension system according to claim 1 wherein said at least one rail support includes a plate provided with recesses mounting magnets forming said magnetic way.

10. The door suspension system according to claim 1 wherein said magnetic way includes one of neodymium rare earth permanent magnets and ferrite permanent magnets.

11. An elevator door suspension system comprising:
- at least one rail support adapted to be attached to a door frame above an elevator doorway opening;
- an elongated rail mounted on said at least one rail support;
- at least two brackets each having a connector attached to a respective support block, each said support block having an opening formed therein receiving at least a portion of said rail;
- an elevator door;
- a support piece attached to said connectors and provided with connection means attached to said door for suspending said door in the doorway opening; and
- an elongated magnetic way attached to one of said at least one rail support and said support piece and a primary of a linear motor attached to the other one of said at least one rail support and said support piece, said magnetic way and said linear motor primary being positioned to generate an attraction force therebetween canceling at least partially a weight of said door.

12. A door suspension system comprising:
- a rail support adapted to be attached to a door frame above a doorway opening and having a plate;
- an elongated rail mounted on an upper surface of said plate;
- a pair of brackets each having a connector attached to a respective support block, each said support block having an opening formed therein receiving at least a portion of said rail;
- a door;
- a support piece attached to said connectors and provided with connection means attached to said door for suspending said door In the doorway opening; and
- an elongated magnetic way attached to one of a lower surface of said plate and an upper surface of said support piece and a primary of a linear motor attached another one of said plate lower surface mid said support piece upper surface, said magnetic way and said linear motor primary being positioned to generate an attraction force therebetween canceling at least partially a weight of said door.

* * * * *